US006620879B1

(12) United States Patent
Albrecht et al.

(10) Patent No.: US 6,620,879 B1
(45) Date of Patent: Sep. 16, 2003

(54) POWDERY POLYETHER CARBOXYLATE-BASED POLYMERIC COMPOSITIONS

(75) Inventors: Gerhard Albrecht, Tacherting (DE); Hubert Leitner, Haus/Ennstal (AT); Alfred Kern, Kirchweidach (DE); Josef Weichmann, Pleiskirchen (DE)

(73) Assignee: Degussa Construction Chemicals GmbH, Trostberg (DE)

( * ) Notice: Subject to any disclaimer, the term of this patent is extended or adjusted under 35 U.S.C. 154(b) by 0 days.

(21) Appl. No.: 09/913,148

(22) PCT Filed: Feb. 8, 2000

(86) PCT No.: PCT/EP00/00999

§ 371 (c)(1),
(2), (4) Date: Sep. 24, 2001

(87) PCT Pub. No.: WO00/47533

PCT Pub. Date: Aug. 17, 2000

(30) Foreign Application Priority Data

Feb. 10, 1999 (DE) .......................................... 199 05 488

(51) Int. Cl.$^7$ ................................................. C08J 3/00
(52) U.S. Cl. ........................ 524/522; 524/442; 524/492; 521/106
(58) Field of Search .......................... 521/106; 524/522, 524/442, 492

(56) References Cited

U.S. PATENT DOCUMENTS

| | | | |
|---|---|---|---|
| 4,735,658 A | 4/1988 | Blet et al. ..................... | 106/171 |
| 4,766,153 A * | 8/1988 | Casciani ....................... | 514/785 |
| 5,002,695 A * | 3/1991 | Schulz et al. ................. | 516/131 |
| 5,047,481 A * | 9/1991 | Siol et al. ..................... | 525/216 |
| 5,324,770 A | 6/1994 | Cosper ......................... | 524/516 |
| 5,491,181 A | 2/1996 | Huggins ....................... | 523/200 |
| 5,670,578 A | 9/1997 | Shawl .......................... | 525/187 |
| 5,719,200 A * | 2/1998 | Staendeke et al. ............ | 521/106 |

FOREIGN PATENT DOCUMENTS

| | | | |
|---|---|---|---|
| DE | 43 25 483 | | 2/1995 |
| EP | 0 838 444 | | 4/1998 |
| EP | 0838444 A1 | * | 4/1998 |
| GB | 2281074 | * | 2/1995 |
| JP | 07-118046 A | * | 5/1995 |
| JP | 10-045451 A | * | 2/1998 |

OTHER PUBLICATIONS

JP Patents Abstracts of Japan—63–39934 A., C–512, Jul. 15, 1998, vol. 12, No. 252.
2–99531 (A); C–734, Jun. 29, 1990, vol. 14, No. 304.
2–153948 (A), C–754, Sep. 4, 1990, vol. 14, No. 406.
Derwent Abst. Ref. 95–203649/27—Abst. JP 7118046 A.

* cited by examiner

*Primary Examiner*—David W. Wu
*Assistant Examiner*—Henry S. Hu
(74) *Attorney, Agent, or Firm*—Fulbright & Jaworski L.L.P.

(57) ABSTRACT

A description is given of pulverulent polymer compositions based on polyether carboxylates, which are characterized in that they comprise a) from 5 to 95% by weight of a water-soluble polymer made up of polyoxyalkylene-containing structural units, carboxylic acid and/or carboxylic anhydride monomers and, if desired, further monomers, and b) from 5 to 95% by weight of a finely divided mineral support material having a specific surface area of from 0.5 to 500 m$^2$/g (determined by the BET method in accordance with DIN 66 131).

These pulverulent polymer compositions, which can contain up to 90% by weight of polyether carboxylate, have a significantly increased sticking and caking resistance compared to spray-dried products and have further advantages when they are used in cement-containing building material mixtures.

23 Claims, No Drawings

POWDERY POLYETHER CARBOXYLATE-BASED POLYMERIC COMPOSITIONS

DESCRIPTION

The present invention relates to pulverulent polymer compositions based on polyether carboxylates, processes for preparing them and their use.

Water-soluble polymers comprising polyoxyalkylene-containing structural units, carboxylic acid and/or carboxylic anhydride monomers and, if desired, further monomers, hereinafter referred to as polyether carboxylates, have recently found uses in a variety of applications.

Apart from their use as dispersion stabilizer in the preparation of water-soluble copolymers (WO 97/30 094), their use as protective colloid in the production of caking-resistant dispersion powders has been described. However, polyether carboxylates are preferably used in building materials such as concrete, mortars, bitumen, knifing fillers, adhesives, pigment-containing paints and coating compositions, in ceramic compositions, in the refractories industry and petroleum processing to exert a targeted influence on the rheological and/or wetting properties of these building materials. Adsorptive interactions which polyether carboxylates can undergo with the hydraulic binder particles of these building materials (cement, lime, calcium sulfate, etc.) result in stabilization of the mineral particles combined with reduced internal friction and thus in improved flow and processing properties. Although these polymers consist of only two significant structural units, namely a polyoxyalkylene-containing unit and a carboxylic acid (anhydride) monomer, a large number of types of linkage are possible. The structural variety of such polyether carboxylates extends from random, alternating or block polymers through to comb polymers having carboxyl groups in the main chain and polyether units in the side chain. Also included are graft copolymers which are formed by functionalization of polyethers by means of monomers containing carboxylic acid groups.

Finally, the group of polyether carboxylates also includes polyesters which are formed by reaction of polyethers, such as polyethylene glycol, with polybasic carboxylic acids or carboxylic anhydrides. It is immaterial whether these polymers are present as the free acid or in their salt form.

The technical advantage of such products as fluidizers in cement-based building materials is, firstly, that long-lasting processability as desired by the concrete transport industry can be achieved with use of extremely small amounts. Secondly, these additives enable the proportion of water to be reduced so greatly that it is possible to produce high-strength concrete which can be removed from the mold or from which the shattering can be removed after only 12 hours, thus meeting a central requirement of the prefabricated parts industry. In addition, the polymers are free of toxicologically problematical constituents such as formaldehyde, which distinguishes them from conventional cement flow improvers, e.g. as disclosed in EP-B 214 412 or DE-C 16 71 017. For a series of applications, it is useful and desirable to provide the water-soluble polyether carboxylates in the form of their aqueous solutions.

However, the use of aqueous preparations can be completely ruled out in other fields of application where the polymers are required as additives in factory-produced dry mixes.

Apart from logistic and economic advantages (transport of water!), powders have a number of technical advantages over aqueous preparations. Stabilization against attack by microorganisms by means of addition of biocides becomes unnecessary as do the sometimes complicated measures for tank hygiene. Since polyether carboxylates can, owing to their surface-active properties, introduce undesirably high proportions of air into the building material, antifoams are generally mixed into the aqueous preparations after they have been prepared.

Owing to the incompatibility of the antifoam in the aqueous medium of the polyether carboxylate, sedimentation and/or flotation phenomena occur, which leads to considerable problems at the end user.

If the polyether units in the polyether carboxylates are incorporated in the main chain or bound as side chain constituents on the main chain via ester groups, undesirable hydrolysis with destruction of the polymer structure can occur already during storage of the aqueous preparations.

This problem can be countered only "symptomatically" by storage at low temperatures, which greatly restricts the use of such aqueous preparations, particularly in hot climatic zones. In addition to the unsatisfactory stability at temperatures above 30° C., there is the sensitivity to frost. Owing to the abovementioned facts, the use of powders has always been found to be preferable to the use of aqueous preparations.

According to the prior art, polymer powders based on polyether carboxylates are obtained by spray drying the aqueous preparations in a stream of hot air, during which antioxidants and spray-drying auxiliaries are advantageously added so as to a) prevent spontaneous heating or spontaneous ignition of such polymers during and after the drying process and b) inhibit adhesion of the wax-like polymer particles in the dryer.

Neglect of the safety risks mentioned under a) has in the past led to fires during the spray drying process. Furthermore, despite the use of spray-drying auxiliaries, it is sometimes difficult to isolate a non-sticky and caking-resistant polymer powder, especially when the proportion of polyether in the polymer is high and the proportion of carboxyl groups is low. These disadvantages, the high energy requirement for spray drying and the emission limits to be adhered to during spray drying are particularly serious.

The procedure in which the polyether carboxylate is firstly produced in a solvent-free polymerization, diluted with water and subsequently neutralized is particularly uneconomical. After that, spray drying is carried out with the abovementioned disadvantages in order to remove the water introduced in the dilution process.

It is therefore an object of the present invention to provide pulverulent polymer compositions based on polyether carboxylates which avoid the disadvantages of the prior art, i.e. give products which are storage-stable at high temperatures and are also insensitive to frost, require no preservatives, are stable to spontaneous ignition and thermal oxidative degradation, give sticking- and caking-resistant powders and are obtainable at a low energy consumption and by a rational process.

According to the invention, this object is achieved by pulverulent polymer compositions comprising a) from 5 to 95% by weight of a water-soluble polymer made up of polyoxyalkylene-containing structural units, carboxylic acid and/or carboxylic anhydride monomers and, if desired, further monomers, and b) from 5 to 95% by weight of a finely divided mineral support material having a specific surface area of from 0.5 to 500 m²/g (determined by the BET method in accordance with DIN 66 131).

It has surprisingly been found that the incorporation of the polyether carboxylates (component a) into the mineral component b) can be made so effectively that up to 90% by weight of active ingredient, i.e. the polyether carboxylate component, in the polymer composition can be achieved.

In addition, it was particularly surprising that the sticking and caking resistance was considerably increased compared to spray-dried products and additional advantages were found in the use of the compositions in cement-containing building material mixtures.

The water-soluble polymers used for preparing the polymer composition of the invention are products which contain polyoxyalkylene groups, preferably polyethylene glycol or polypropylene glycol groups, in the main chain or in the side chain and additionally comprise carboxylic acid and/or carboxylic anhydride monomers, preferably acrylic acid, methacrylic acid, maleic acid, maleic anhydride, fumaric acid, itaconic acid and itaconic anhydride. Further monomers based on vinyl or acrylate groups can additionally contribute to making up the polyether carboxylates. Examples of such further monomers are styrene, α-methylstyrene, isobutene, diisobutene, cyclopentadiene, ethylene, propylene, isoprene, butadiene, acrylonitrile, chloroprene, vinyl acetate, N-vinylpyrrolidone, methyl acrylate, methyl methacrylate, n-butyl acrylate, 2-ethylhexyl acrylate, acrylamide, methacrylamide, acrylamidomethylpropane-sulfonic acid, styrenesulfonic acid, vinyl chloride, methyl vinyl ether, ethyl vinyl ether, allyl alcohol, allylsulfonic acid, allyl chloride and others.

The polymers can be linear, have short-chain branching, have long-chain branching or be crosslinked and can have comb structures, star structures, dumb-bell structures and other morphologically conceivable structures.

Examples are block copolymers of polymethacrylic acid and polyethylene glycol, comb-like polymers having a polymethacrylic acid main chain and individual polyethylene oxide side chains bound via ester groups, maleic anhydride/styrene copolymers partially esterified with methylpolyethylene glycol, allylpolyethylene glycol/maleic acid copolymers, vinylpolyethylene glycol/maleic monoester copolymers, graft copolymers comprising a polyethylene glycol or polypropylene glycol skeleton and maleic anhydride or acrylic acid side chains which may in turn be esterified or partially esterified.

Polyesters, polyamides and polyurethanes which are based on alkylene oxides such as ethylene oxide, propylene oxide or butylene oxide and bear ionic groups and are therefore water-soluble are also possible.

These polyether carboxylates can be in the form of their free acids or in neutralized form and can be prepared by solution polymerization, bulk polymerization, inverse emulsion polymerization or suspension polymerization.

In preferred embodiments, polyether carboxylates prepared by bulk polymerization are used. In the case of these, the usefulness of the invention is particularly high since in the prior art these firstly have to be diluted with water, neutralized and subsequently subjected to spray drying to remove the previously introduced water and convert them into a powder.

It is an essential aspect of the invention that the finely divided mineral support materials used have a specific surface area of from 0.5 to 500 m²/g (determined by the BET method in accordance with DIN 66 131). The proportions by weight of support materials in the pulverulent polymer compositions depend on the type of polymer, its composition and the form in which it is incorporated and also on the specific surface area and the adsorption capacity of the mineral support material. They can therefore vary within a very wide range from 5 to 95% by weight.

The type of these support materials is subject to no particular restriction. It is important that the material is readily compatible with the polyether carboxylate, does not have an adverse effect on the action of the polymer and even in small amounts gives pulverulent sticking- and caking-resistant polymer compositions.

Preference is given to using chalk, silica, calcite, dolomite, quartz flour, bentonite, ground pumice, titanium dioxide, fly ash, cement (Portland cement, blast furnace cement, etc.), aluminum silicate, talc, anhydrite, lime, mica, kieselguhr, gypsum, magnesite, alumina, kaolin, ground slate and other rocks, barium sulfate and also mixtures of these materials. According to a preferred embodiment, the mineral support material already comprises one or more mineral components of a building material.

The finely divided support materials have a preferred particle size of from 0.1 to 1000 μm.

If desired, the mineral support materials can be used in combination with organic (nonmineral) additives such as cellulose powders or cellulose fibers and also powders or fibers of organic polymers (polyacrylonitrile, polystyrene, etc.).

The invention also provides a process for preparing the pulverulent polymer compositions, which is characterized in that the polyether carboxylate is incorporated into the respective mineral support material immediately after the polymerization process for preparing the polyether carboxylate. The polymer is preferably introduced into the initially charged and, if desired, preheated mineral support material in as finely divided a form as possible, with the polyether carboxylate being a bulk polymer or being able to be in the form of an aqueous solution, an inverse emulsion or a suspension.

In a preferred embodiment, a polyether carboxylate prepared by bulk polymerization at from 110 to 140° C. is sprayed at a temperature in the range from 70 to 120° C. onto a preheated mineral support material (for example of the silica type) in a mixer.

Particularly effective incorporation with very low consumption of mineral support material can be achieved by applying the polyether carboxylate as a mist onto the preheated support material. The effectiveness drops when the polymer is sprayed, dripped or poured onto the support material, because the surface area of the substance to be incorporated decreases in that order.

Furthermore, the mixing technique in the incorporation is of particular interest and depends very strongly on the type of support material used.

Support materials having a pronounced porous structure, e.g. silicas, have a particularly high adsorption capacity.

Mixers in which high shear forces occur near the mixing devices can destroy the porous structure, as a result of which polyether carboxylates present in the voids can be squeezed out again. It is therefore advisable to use mixing apparatuses in which low shear forces occur, e.g. drum mixers, V mixers, tumble mixers or other representatives of free-fall mixers, for this type of support.

Further suitable mixers for porous supports are cone mixers, plowshare mixers or spiral mixers having vertically or horizontally installed mixing elements. In the case of mineral supports whose structure cannot be destroyed by the mixing process, all other types of apparatus, e.g. dissolvers, screw mixers, twin-screw mixers, air-mix mixers and others, are also usable.

Finally, it is possible within the scope of the present invention to follow the incorporation of the polyether carboxylate into the support by a drying process so as to increase the productivity of the support material.

The invention further provides for the use of at least one pulverulent polymer composition according to the present invention in building materials, suitable building materials being bitumen products, such as asphalt, bituminous adhesive, sealing, knifing and paint or coating compositions (rooftop parking areas), or products based on hydraulically setting binders such as cement or based on latent hydraulic binders such as fly ash and trass, such as mortar (casting mortar), screeds, concrete, plasters and renders, adhesive, sealing and knifing compositions and also paints. A further group of possible building materials comprises gypsum-based building materials (mortar, plaster, screed), anhydrite-based building materials, the other building materials based on calcium sulfate, the group of ceramic compositions, refractory compositions and oilfield materials. Finally, the polymer compositions of the invention can also be used in dispersion-based building materials such as dispersion tile adhesives, elastic sealing slurries, foundation coatings, mortar adhesion additives and pulverulent interior and exterior wall paints.

The pulverulent polymer compositions of the invention can also be used in combination with the abovementioned groups of building materials, e.g. in bitumen-containing cement screeds, casting mortars, etc.

The incorporation of the pulverulent polyether carboxylates into the building material is generally carried out together with that of other fillers and building material additives, such as dispersion powders, water retention improvers, thickeners, retardants, accelerators, wetting agents, etc. The proportion of polyether carboxylate is usually from 0.1 to 5% by weight, based on the weight of the building material. The pulverulent polymer compositions of the invention have a series of advantages compared to polyether carboxylates obtained in powder form by conventional means. This will be illustrated by the following examples.

EXAMPLES

Example 1

In a tumble mixer from Bachofen AG, Basle, a pulverulent polymer composition consisting of 75 g of a precipitated silica having a specific surface area of 190 $m^2/g$ and preheated to 80° C. and 425 g of a molten polyether carboxylate (A) is prepared at 80° C. by mixing for 75 minutes.

The polyether carboxylate (A) was prepared by solvent-free polymerization as follows:

50.1 g of maleic anhydride (0.51 mol) are esterified with 294 g of methylpolyethylene glycol 1150 (0.256 mol) at a temperature of 120° C. for 3 hours with careful exclusion of atmospheric oxygen. 72.8 g of styrene (0.7 mol) containing a small amount of n-dodecyl mercaptan and 8.3 g of azobisisobutyronitrile dissolved in 50 ml of acetone were introduced as separate feed streams at 110° C. over periods of 90 min and 120 min respectively into the initial mixture obtained in this way. The reaction vessel was continually flushed with nitrogen so that much of the acetone could be driven out even during the feed stream addition phase. In a 2-hour after-reaction at 120° C., the remaining acetone was removed to give a light-yellow bulk polymer of maleic anhydride, styrene and methylpolyethylene glycol 1150 monomaleate in a molar ratio of 0.5:1.37:0.5 (polyether carboxylate A). After addition of 0.5% by weight of an antioxidant and spraying onto the abovementioned mineral support material and mixing for 75 minutes, a sticking- and caking-resistant, free-flowing, ivory-colored powder having an active content of polyether carboxylate of 85 percent by weight (mean particle diameter: 39 $\mu$m) was obtained.

Comparative Example 1

In accordance with the prior art, the bulk polymer synthesized in Example 1 was cooled to 80° C. and stirred into 425 g of water. After the aqueous solution obtained had cooled, the pH was set to 8.5 by slow addition of dilute aqueous sodium hydroxide. 0.5% by weight, based on the polymer content, of an antioxidant was stirred in, and the polymer solution was, for viscosity reasons, diluted with water to 30% by weight before being converted into a powder in a laboratory spray dryer from NIRO. This gave a light-brown powder which had a mean particle diameter of 54 mm [sic] and had a very strong tendency to form lumps.

The powders obtained in the examples were characterized in respect of the following data:

1. Polymer content (GPC)
2. Flow behavior of the powders (outflow from a vessel with a bottom outlet)
3. Caking resistance of the powders (under 2 kg pressure)
4. Fluidizing effect in a cement building material mixture Examples 2 to 9

These were carried out using the procedure described in Example 1, but the following finely divided mineral support materials were used in place of the silica used there (Table 1):

TABLE 1

| Example | Support Type | Specific surface area ($m^2/g$) | Proportion by weight of Polymer/Support (%) |
|---|---|---|---|
| 2 | chalk | 11 | 40:70 |
| 3 | dolomite (micronized) | 4 | 45:55 |
| 4 | kieselguhr | 65 | 55:45 |
| 5 | calcium silicate | 35 | 70:30 |
| 6 | aluminum silicate | 100 | 50:50 |
| 7 | sodium aluminum silicate | 80 | 65:35 |
| 8 | precipitated silica | 450 | 80:20 |
| 9 | precipitated silica/chalk (1:1) | 450 11 | 75:25 |

Examples 10 to 15

In place of the polyether carboxylate obtained by solvent-free copolymerization which was used in Example 1, the following polymers were used (Table 2):

TABLE 2

| Example | Polyether carboxylate[2] | Type of synthesis | Weight ratio of polymer/support[1] (%) |
|---|---|---|---|
| 10 | B | bulk polymerization | 87:13 |
| 11 | C | bulk polymerization | 90:10 |

TABLE 2-continued

| Ex-ample | Polyether carboxylate[2] | Type of synthesis | Weight ratio of polymer/support[1] (%) |
|---|---|---|---|
| 12 | D | bulk polymerization | 81:19 |
| 13 | E | bulk polymerization | 80:20 |
| 14 | F | bulk polymerization (graft polymerization) | 75:25 |
| 15 | G | aqueous solution polymerization | 67:33 |

[1]Support: precipitated silica (specific surface area: 190 m$^2$/g)
[2]Polymer compositions:
B Maleic anhydride-styrene-methylpolyethylene glycol 2000 monomaleate copolymer (molar ratio = 0.60:1.37:0.40)
C Maleic anhydride-styrene-methylpolyethylene glycol 5000 monomaleate copolymer (molar ratio = 0.73:1.37:0.27)
D Maleic anhydride-allylpolyethylene glycol 1100 monoethyl ether copolymer (molar ratio = 1.15:1)
E Maleic anhydride-vinylpolyethylene glycol 500 monomethyl ether copolymer (molar ratio = 1.10:1)
F to 50 mol %-esterified graft copolymer of methylpolyethylene glycol 500 and maleic anhydride (molar ratio = 1:1.6)
G Maleic acid-ethylene glycol monovinyl ether-methylpolyethylene glycol 2000 monoethyl ether copolymer (molar ratio = 0.40:0.85:0.37), solids content = 45%, sodium salt, pH = 6.5)

Comparative Examples 2 to 7

The polyether carboxylates B to G listed in Examples 10 to 15 were diluted, neutralized, provided with an antioxidant and converted into powder by means of spray drying using the procedure indicated in Comparative example 1.

The test results obtained from Examples according to the invention 1 to 15 and Comparative examples 1 to 7 are summarized in the following use examples.

Use Example 1

Polymer Content of the Pulverulent Polymer Compositions in the Examples According to the Invention and the Comparative Examples The polymer content was determined by gel permeation chromatography (conditions: Waters (Milford, Mass.); Shodex OH Pak KB-804 and KB-802.5; standard: polyethylene glycol; eluant: NH$_4^+$HCOO/CH$_3$CN 80:20 v/v).

It has been found that direct conversion of the polymers as described in Examples 1 to 15 into powders is not associated with a reduction in the active polymer content. In contrast, in the case of polymers which contain ester bonds and have been converted into powders by methods according to the prior art, the polymer content after spray drying is significantly reduced. This is attributable to part of the polyether constituents bound via ester groups in the polyether carboxylates in the form of comb or graft copolymers being split off in the dilution, neutralization and spray drying process.

TABLE 3

| Example | Polyether carboxylate[1] | Polymer content[2] (% by weight) after polymerization | in the powder |
|---|---|---|---|
| Example 1 | A | 89.7 | 89.6 |
| Example 2 | A | 88.9 | 88.7 |

TABLE 3-continued

| Example | Polyether carboxylate[1] | Polymer content[2] (% by weight) after polymerization | in the powder |
|---|---|---|---|
| Example 6 | A | 87.4 | 87.6 |
| Example 8 | A | 86.6 | 86.7 |
| Example 9 | A | 88.0 | 88.0 |
| Comparison 1 | A | 89.2 | 79.4 |
| Example 10 | B | 82.2 | 83.0 |
| Comparison 2 | B | 81.7 | 73.6 |
| Example 11 | C | 79.5 | 79.5 |
| Comparison 3 | C | 79.2 | 70.0 |
| Example 14 | F | 90.4 | 90.3 |
| Comparison 6 | F | 90.3 | 83.8 |

[1]Polymer composition as per Example 1 and Table 2
[2]GPC

Use Example 2
Powder Flow Behavior of the Polymer Compositions According to the Invention and of Comparative Polymers The powder flow (without application of pressure) was determined by the method of K. Klein: Seifen, Öle, Fette, Wachse 94 (1968), page 12, for various polymer compositions. For this purpose, silicone-treated glass vessels with a bottom outlet and different outlet diameters were filled to the brim with the test substance. For the evaluation, grades were assigned on the scale from 1, i.e. the powder flowed from the vessel with the smallest outlet opening (ø=2.5 mm) without stopping, to 6, i.e. the powder does not flow even from the vessel with the largest opening (ø=18 mm). The measurements for each powder were commenced using the vessel with the largest outlet opening.

TABLE 4

| Example | Polyether carboxylate[1] | Powder flow Evaluation grade for powder flow |
|---|---|---|
| Example 1 | A | very good (1) |
| Example 2 | A | good-satisfactory (2–3) |
| Example 3 | A | satisfactory (3) |
| Example 4 | A | good (2) |
| Example 5 | A | good (2) |
| Example 6 | A | good (2) |
| Example 7 | A | very good (1) |
| Example 8 | A | very good (1) |
| Example 9 | A | good (2) |
| Comparison 1 | A | unsatisfactory (6) |
| Example 10 | B | very good (1) |
| Comparison 2 | B | poor (5) |
| Example 11 | C | very good (1) |
| Comparison 3 | C | sufficient (4) |
| Example 12 | D | good (2) |
| Comparison 4 | D | unsatisfactory (6) |
| Example 13 | E | satisfactory (3) |
| Comparison 5 | E | unsatisfactory (6) |
| Example 14 | F | good (2) |
| Comparison 6 | F | sufficient (4) |
| Example 15 | G | satisfactory (3) |
| Comparison 7 | G | sufficient (4) |

[1]polymer composition as per Example 1 and Table 2

Use Example 3
Caking Resistance of Polymer Compositions According to the Invention and of Comparative Polymers Pulverulent products tend to cake when stacked in bags or in a hopper. To assess the caking resistance or "stackability", the powder to be tested was introduced to a height of about 20 mm into a steel cylinder having an internal diameter of 50 mm and loaded by means of a punch having a weight of 1.2 kg and a loading weight of 2 kg.

The pressure prevailing in this test arrangement is 0.17 kg/cm$^2$, which corresponds to the pressure of from 10 to 12 bags having a weight of 50 kg stacked on top of one another. After loading for 24 hours, the loading weight was removed and the powder pellet was ejected from the cylinder. The hardness of the powder pellet is regarded as a criterion for the caking resistance according to the following assessment scheme.

Use Example 4

Fluidizing Effect in a Cement-containing Building Material

The powder obtained from the examples according to the invention and from the comparative examples were examined in respect of their use properties in a mortar formulation. For this purpose, the pulverulent polymer compositions were mixed dry with the amounts of sand and Portland cement (CEM I 42.5 R Kiefersfelden) prescribed in accordance with DIN 1164 part 7. This was followed by addition of water and mixing of the constituents in accordance with the standard. The slump of the fresh mortar was determined for each powder type immediately and after 15, 30, 45 and 60 minutes

TABLE 7

| Example | Polymer addition[1] | Polyether carboxylate | Slump (cm) | | | | |
| --- | --- | --- | --- | --- | --- | --- | --- |
| | | | immediately | 15 min | 30 min | 45 min | 60 min |
| 1 | 0.15 | A | 23.5 | 22.5 | 20.1 | 19.0 | 18.3 |
| comparison 1 | 0.15 | A | 22.9 | 19.6 | 17.4 | 16.3 | 15.4 |
| 10 | 0.15 | B | 25.0 | 24.1 | 22.1 | 19.3 | 17.2 |
| comparison 2 | 0.15 | B | 24.3 | 22.0 | 19.4 | 17.0 | 14.0 |
| 11 | 0.20 | C | 26.1 | 23.6 | 21.1 | 19.9 | 18.4 |
| comparison 3 | 0.20 | C | 25.4 | 21.6 | 19.9 | 17.3 | 14.6 |
| 15 | 0.15 | G | 27.9 | 26.1 | 24.9 | 23.9 | 23.0 |
| comparison 7 | 0.15 | G | 26.0 | 24.0 | 21.4 | 20.0 | 17.3 |

[1]In % by weight of polyether carboxylate based on the weight of cement
[2]Polymer composition as per Example 1 and Table 2

TABLE 5

| Assessment | Grade | Behavioral feature |
| --- | --- | --- |
| very good | 1 | completely unchanged |
| good | 2 | adheres slightly, disintegrates into the original state |
| satisfactory | 3 | loosely shaped, disintegrates into a powder under gentle finger pressure |
| sufficient | 4 | loosely caked, just still disintegrates |
| poor | 5 | semifirmly caked, no longer disintegrates |
| unsatisfactory | 6 | strongly compacted |

The following results were obtained:

TABLE 6

| Example | Polyether carboxylate[1] | Evaluation code for caking resistance |
| --- | --- | --- |
| 1 | A | good (2) |
| comparison 1 | A | sufficient (4) |
| 10 | B | good (2) |
| comparison 2 | B | poor (5) |
| 11 | C | good (2) |
| comparison 3 | C | satisfactory (3) |
| 12 | D | good (2) |
| comparison 4 | D | sufficient (4) |
| 13 | F | good (2) |
| comparison 5 | F | sufficient (4) |
| 15 | G | good (2) |
| comparison 7 | G | satisfactory (3) |

[1]Polymer composition as per Example 1 and Table 2

W/Z=0.45
CEM I 42.5 R Kiefersfelden
1% by weight of tributyl phosphate based on polymer Due to the loss of polyether side chains, the processability of mortar mixtures containing polymer powders prepared according to the prior art deteriorates significantly more quickly than that of mixtures containing pulverulent powder compositions according to the invention. This is attributable to the reduced steric stabilization of the cement particles.

What is claimed is:

1. A pulverulent polymer composition based on polyether carboxylates, comprising
   a. from 5% to 95% by weight of a water-soluble polymer made up of polyoxyalkylene-containing structural units, carboxylic acid or carboxylic anhydride monomers; and,
   b. from 5% to 95% by weight of a finely divided mineral support material having a specific surface area of from 0.5 m$^2$/g to 500 m$^2$/g as determined by the BET method in accordance with DIN 66 131 and is obtained by spraying molten polyether carboxylate onto a mineral support material at a temperature of from 70° C. to 120° C.

2. The polymer composition according to claim 1, wherein the water-soluble polymer contains polyethylene glycol or polypropoylene glycol groups in its main chain or in its side chain.

3. The polymer composition according to claim 1, wherein the carboxylic acid or carboxylic anhydride monomers comprise acrylic acid, methacrylic acid, maleic acid, maleic acid anhydride, fumaric acid, itaconic acid or itaconic anhydride.

4. The polymer composition according to claim 1, wherein the water-soluble polymer further comprises monomers based on vinyl or acrylate compounds.

5. The polymer composition according to claim 1, wherein the support material is selected from the group consisting of chalk, silica, calcite, dolomite, quartz flour, bentonite, ground pumice, titanium dioxide, fly ash, cement, aluminum silicate, talc, anhydrite, lime, mica, kieselguhr, gypsum, magnesite, alumina, kaolin, ground slate and other rocks, barium sulfate, and mixtures thereof.

6. The polymer composition according to claim 1, wherein the mineral support materials are used in combination with at least one organic additive.

7. The polymer composition according to claim 1, wherein the support materials have a particle size of from 0.1 μm to 1000 μm.

8. A process for preparing the polymer composition according to claim 1, comprising incorporating the polyether carboxylate into the mineral support material immediately after the polymerization of the polyether carboxylate.

9. The process according to claim 8, wherein the polyether carboxylate is a bulk polymer.

10. The process according to claim 8, further comprising spraying molten polyether carboxylate onto a preheated mineral support material at a temperature of from 70° C. to 120° C.

11. The process according to claim 8, wherein the polyether carboxylate is incorporated into the mineral support material in the form of an aqueous solution, an inverse emulsion or a suspension.

12. The process according to claim 8, wherein said support material has a porous structure, and said polyether carboxylate is incorporated into said support material by using a mixer which produces low shear forces.

13. A method for making a building material, comprising combining from 0.1% to 5% by weight of the pulverulent polymer composition of claim 1, with a pre-existing building material.

14. The method of claim 13, wherein said pre-existing building material is a bitumen product, a building material based on hydraulically setting binders, a gypsum based product, a calcium sulfate based product, a ceramic composition, a refractory composition, an oil field material, or a dispersion based material.

15. The method of claim 13, further comprising adding at least one of building material additive or a filler component.

16. The method of claim 14, wherein said additive is a dispersion powder, a water retention improver, a thickener, a retardant, an accelerator or a wetting agent.

17. The pulverulent polymer composition of claim 1, wherein said water soluble polymer comprises an additional monomer.

18. The pulverulent polymer composition of claim 1, wherein said additional monomer is a carboxylic acid monomer, or a carboxylic anhydride monomer.

19. The polymer composition of claim 5, wherein said cement is Portland cement or blast furnace cement.

20. The polymer composition of claim 6 wherein said at least one organic additive is a cellulose powder, a cellulose fiber, an organic polymer powder or an organic polymer fiber.

21. The process according to claim 12, wherein said mixer is a free fall mixer.

22. The method of claim 14, wherein said hydraulically setting binder is cement or a latent hydraulic binder.

23. The method of claim 14, wherein said calcium sulfate based product is a calcium sulfate anhydrite.

* * * * *